United States Patent
Calegari et al.

(10) Patent No.: US 11,665,152 B2
(45) Date of Patent: May 30, 2023

(54) METHOD AND SYSTEM FOR DISCOVERING AND LOGGING NEW MICROSERVICES FOR A PLATFORM FOR UNIFIED GOVERNANCE OF A PLURALITY OF INTENSIVE COMPUTING SOLUTIONS

(71) Applicant: BULL SAS, Les Clayes-sous-Bois (FR)

(72) Inventors: Patrice Calegari, Boissy-sous-Saint-Yon (FR); Marc Levrier, Saint-Cyr-Sous-Dourdan (FR)

(73) Assignee: BULL SAS, Les Clayes sous-Bois (FR)

( * ) Notice: Subject to any disclaimer, the term of this patent is extended or adjusted under 35 U.S.C. 154(b) by 98 days.

(21) Appl. No.: 17/213,566

(22) Filed: Mar. 26, 2021

(65) Prior Publication Data
US 2021/0306321 A1    Sep. 30, 2021

(30) Foreign Application Priority Data
Mar. 27, 2020 (FR) ...................... 2003058

(51) Int. Cl.
*H04L 9/40* (2022.01)
*H04L 67/51* (2022.01)

(52) U.S. Cl.
CPC ...... *H04L 63/0807* (2013.01); *H04L 63/0281* (2013.01); *H04L 63/0815* (2013.01); *H04L 63/108* (2013.01); *H04L 67/51* (2022.05)

(58) Field of Classification Search
CPC .................................................. H04L 63/0807
See application file for complete search history.

(56) References Cited

U.S. PATENT DOCUMENTS 9,838,376 B1    12/2017 Lander et al.
2017/0230349 A1*    8/2017 Gaur .................. G06F 21/57
(Continued)

FOREIGN PATENT DOCUMENTS

CN    110224855    9/2019
WO    2018053122    3/2018

OTHER PUBLICATIONS

Preliminary Search Report issued in FR2003058, dated Dec. 21, 2020 (35 pages).
(Continued)

*Primary Examiner* — Esther B. Henderson
(74) *Attorney, Agent, or Firm* — ARC IP Law, PC; Joseph J. Mayo

(57) ABSTRACT

A method (800) for logging microservices in a platform for unified governance of a plurality of intensive computing solutions (70) comprising: a proxy microservice (20), a token security microservice (30), at least one security repository (35,36,37), a logging module (90), a service register (91), and comprising the steps of:

Reception (820) of a join request from a new microservice (60),

Verification (830) of the unique identifier of the new microservice (IDMS),

Generation (840) of an authentication token and transmission to the new microservice, Reception (850) of a logging request from a new microservice, comprising data that provides access to the resources of the new microservice and the generated authentication token, Verification (860) of the authentication token with the token security microservice (30), (Continued)

Logging (870), when the authentication token is validated, data that provides access to the resources of the new microservice on the service register (91).

10 Claims, 6 Drawing Sheets

(56) References Cited

U.S. PATENT DOCUMENTS

| | | | |
|---|---|---|---|
| 2017/0331812 A1* | 11/2017 | Lander | H04L 63/0815 |
| 2018/0026984 A1* | 1/2018 | Maker | H04L 63/102 |
| | | | 726/4 |
| 2018/0081983 A1* | 3/2018 | Carru | H04L 63/0815 |
| 2018/0270237 A1* | 9/2018 | Lewis | H04L 9/0894 |
| 2018/0307524 A1* | 10/2018 | Vyas | G06F 21/31 |
| 2018/0375950 A1* | 12/2018 | Walker | H04L 67/563 |
| 2019/0004871 A1 | 1/2019 | Sukhomlinov et al. | |
| 2019/0065241 A1* | 2/2019 | Wong | G06F 11/0751 |
| 2019/0095258 A1* | 3/2019 | Chandrasekaran | G06F 9/542 |
| 2019/0332522 A1* | 10/2019 | Leydon | H04L 65/611 |
| 2019/0349194 A1* | 11/2019 | Fan | H04L 9/0891 |
| 2020/0125700 A1* | 4/2020 | Chang | G06F 21/6218 |
| 2020/0134759 A1* | 4/2020 | Refila | G06N 20/00 |
| 2020/0250074 A1* | 8/2020 | Zhang | G06F 11/3664 |
| 2020/0293337 A1* | 9/2020 | Rangasamy | H04L 67/1097 |
| 2021/0029110 A1* | 1/2021 | Yan | H04L 63/0846 |
| 2021/0081463 A1* | 3/2021 | Walker | G06F 16/958 |
| 2021/0081706 A1* | 3/2021 | Kiang | G06N 3/08 |
| 2021/0288954 A1* | 9/2021 | Saravanan | H04L 9/3213 |
| 2021/0289005 A1* | 9/2021 | Chacko | H04L 63/0807 |
| 2021/0303636 A1* | 9/2021 | Dua | G10L 15/22 |
| 2022/0083407 A1* | 3/2022 | Nadendla | G06F 9/4881 |

OTHER PUBLICATIONS

Robert Ramac, et al., "The Challenges of Developing a Multi-Domain Microservices Platform: The Case of REQSTER", Conference: 1st International Conference on Microservices, Oct. 1, 2017; pp. 1-5.

Christina Terese Joseph, et al., "Straddling the crevasse: A review of microservice software architecture foundations and recent advancements", Software Practice and Experience, vol. 49, No. 10, Oct. 19, 2019; pp. 1448-1484.

Nkomo Peter, et al., "Software Development Activities for Secure Microservices", Jun. 29, 2019; Advances in Databases and Information Systems; pp. 573-585.

European Search Report issued in EP21165018.9 dated Sep. 7, 2021 (6 pages).

* cited by examiner

METHOD AND SYSTEM FOR DISCOVERING AND LOGGING NEW MICROSERVICES FOR A PLATFORM FOR UNIFIED GOVERNANCE OF A PLURALITY OF INTENSIVE COMPUTING SOLUTIONS

BACKGROUND OF THE INVENTION

Field of the Invention

The invention focuses on the field of high performance computations, and more specifically on the interfacing on a same platform of several intensive computing solutions having different business logics. The invention notably relates to a method for logging new microservices on a platform centralising access to a plurality of intensive computing solutions. Moreover, the invention relates to a system for logging new microservices capable of managing the logging of new microservices, in a platform centralising access to a plurality of intensive computing solutions, without having to stop the platform or any service being associated therewith.

Description of the Related Art

High performance computing, also called HPC, is being developed for university research and for industry, notably in technical fields such as aeronautics, energy, climatology and life sciences. These computations are generally implemented by clusters. The objective of these clusters is to exceed the limits of existing hardware by pooling resources in order to enable the execution in parallel of instructions and the aggregation of memory and disk capacity. A cluster is a set of computing means (also called nodes or servers) interconnected by an interconnection network being able to carry out shared operations. High performance computing (HPC) is being adopted by more and more scientists to help them resolve complex problems. In particular, with an increase between 2017 and 2018 of more than 50% of the power of the most powerful computer in the world, the computing power of supercomputers is ever increasing. In addition, an increasing number of computing centres (local, regional, national and international) equipped with petaflop class systems exist. Given that it is not possible for all the users to invest in computer architectures capable of deploying such computing powers, some have become specialised in the supply of access to these high performance computing solutions.

Thus, the last few years have witnessed the appearance of platforms for accessing intensive computing solutions (EP3109759). In particular, numerous HPC portals have been developed. Internet portals are a shared route for accessing the information and services available on computer networks. Portals often offer a unique access point to data and to applications. Moreover, a portal may present a unified and personalised view of information to users.

Numerous HPC projects are developing their own community-specific Web portal and some HPC cloud suppliers have developed Web portals for their own use. The relationships between the portal and these information and storage systems are essential but complex to implement in a secure and efficient manner. The data processed in HPC environments may be highly confidential (in particular for industry or financial organisations). HPC portals must be able to manage these constraints in the manner in which they execute the services on the main server (via the borrowing of identity, that is to say that they execute the service "as" the authenticated user), as well as in the way in which they display or filter information in the HPC portal.

In addition, beyond computing power and high performance computing, scientific users wish to be able to access intensive computing solutions such as quantum machines, quantum simulation, "Deep Learning" platforms or more widely platforms dedicated to the development of artificial intelligence solutions.

However, each of these solutions is hosted or made accessible by companies dedicated to one or the other of these technologies and the notably simultaneous use of these different intensive computing solutions becomes laborious.

Moreover, such solutions centralising pluralities of intensive computing solutions have to be structured in such a way as to enable the addition or the modification of services in a secure and transparent manner.

Thus, with the multiplication of the types of intensive computing solutions and the complementarity of some of these solutions, it appears necessary to be able to have available a platform capable of hosting and logging new services in a secure manner and without this necessitating the stoppage and the re-starting of the platform.

Technical Problem

The invention thus has the aim of overcoming the drawbacks of the prior art. In particular, the invention has the aim of proposing a method for logging a new microservice on a platform for unified governance of a plurality of intensive computing solutions, said method enabling hot logging. The invention further has the aim of proposing a system for logging a new microservice on a platform for unified governance of a plurality of intensive computing solutions.

BRIEF SUMMARY OF THE INVENTION

To do so, the invention pertains to a method for logging microservices in a platform for unified governance of a plurality of intensive computing solutions, said intensive computing solutions comprising at least two solutions selected from: a high performance computing server, a server dedicated to supervised or unsupervised learning, and a server dedicated to quantum computations; the unified governance platform comprising: a token security microservice, at least one security repository, a logging module, a service register; said microservice logging method comprising the steps of:

Reception, by the token security microservice, of a join request from a new microservice, said join request comprising a unique identifier of the new microservice;

Verification, by the token security microservice, of the unique identifier of the new microservice from information memorised in the security repository;

Generation of an authentication token and transmission of the authentication token to the new microservice by the token security microservice, and Reception, by the logging module, of a logging request from a new microservice, said logging request comprising data for accessing the resources of the new microservice and the generated authentication token;

Verification of the generated authentication token with the token security microservice, and Logging, by the logging module, when the authentication token is validated, data for accessing the resources of the new microservice on the service register.

A method according to the present invention makes it possible to couple a new microservice to a unified governance platform in a secure and transparent manner. The new microservice will be able, after its logging, to accept requests processed by the unified governance platform. In particular, the proxy microservice will be able to access with the logging module data for accessing the resources (e.g. URL—Uniform Resource Locator) of the new microservice such as endpoints.

The method according to the invention is advantageously implemented within the scope of a unified governance of a plurality of intensive computing solutions making it possible to expose, according to a single model, highly varied intensive computing or high performance application fields and models: High Performance Parallel Computing, Artificial Intelligence, Deep Learning and quantum computing simulation. This unified governance enables a general convergence of various fields seeking to exploit the power and the flexibility of computing clusters or supercomputers as well as the cloud use thereof.

In particular, the method according to the invention enables logging of new microservices without there being the need to stop and to restart the platform.

The method according to the invention enables a single authentication of all the microservices. To do so, part of the security verification of the unified governance in an execution environment is advantageously carried out by the token security microservice of the microservice logging system. Such a method enables a very flexible and generic authentication (ensured by the security microservice) and to come within the scope of the good practice of separation of concerns (SoC), one of the cornerstones of software security.

Thus, the method according to the invention enables management of the logging of microservices within the scope of a solution proposing a single entry point to different business logics (backends) and does so with a unified ergonomics and security repository (e.g. standardised buttons, menus, workflow logics, authorisation policy, etc).

According to other characteristics of the method for logging microservices, said method may include one or more of the following characteristics, alone or in combination:
- the method further comprises a step of continuously updating the service register and in particular the data for accessing the resources of the new microservice (for example the URLs of the endpoints). Thus, the user client, the proxy microservice or the logging module as a function of the architectures will always have access to data for accessing up to date resources.
- the join request further comprises a password of the new microservice and in that the token security microservice also verifies the password of the new microservice. This makes it possible to increase the security of the solution.
- the join request further comprises an identifier of an administrator of the unified governance platform and a password for said administrator of the unified governance platform and in that the token security microservice also verifies the identifier of the administrator of the unified governance platform and its password. Similarly, this makes it possible to reinforce the security of the solution and to associate it with a natural person in charge of the joining of this new microservice.
- The method further comprises a step of verification of the generated authentication token with the token security microservice. This makes it possible to reinforce the security (separation of concerns and delegation to a specialised security service) and the modularity of the solution.
- The method comprises:
    - a step of reception by the logging module of the logging request sent by the new microservice;
    - a step of sending, by the logging module, the generated authentication token to the token security microservice; then
    - a step of verification of the generated authentication token with the token security microservice.
- The method may also comprise the putting in place of information for routing client requests to the module, the microservice or the intensive computing solution serving a resource or a service requested via the proxy microservice.
- Thus, the method delegates the verification of the tokens to the token security microservice. This makes it possible to reinforce the security and the modularity of the solution.
- the unified governance platform comprises a proxy microservice and in that the method comprises:
    - a step of reception by the proxy microservice of the logging request sent by the new microservice;
    - a step of sending, by the proxy microservice, the generated authentication token to the token security microservice;
    - a step of transmission, by the proxy microservice, of the logging request to the logging module when the authentication token is validated.
- The involvement of the proxy microservice makes it possible to limit direct access of the new microservices to the logging module and thus reinforces the security and the modularity of the solution.
- the new microservice is made accessible to a user client at the level of an aggregated interface and that it comprises a step of transmission of content data of the new microservice to the aggregated interface.
- the unified governance platform comprises a proxy microservice and in that the method comprises a step of transmission of data for accessing the resources of the new microservice by the logging module to the proxy microservice. The involvement of the proxy microservice makes it possible to limit direct access of new microservices to user clients and thus reinforces the security and the modularity of the solution while ensuring its principal role of software router/switcher.
- the proxy microservice is configured, on reception of a service request from a user client, to transmit to the new microservice a request concerning access data received then to transmit the resources or contents obtained to the user client. Moreover, the proxy microservice can verify, preferably with the logging module, the state of the new microservice (e.g. existence, availability) before transmitting the request. Thus, a user client can access, in a secure environment, the resources or contents of a new microservice and do so without having to reinitialise the whole unified governance platform.

Other implementations of this aspect include computer systems, corresponding computer appliances and programmes recorded on one or more computer storage devices, each being configured to carry out the actions of a method according to the invention. In particular, a system of one or several computers may be configured to carry out particular operations or actions, notably a method according to the invention, thanks to the installation of software, microsoftware, hardware or a combination of software, microsoftware or hardware installed on the system. Moreover, one or more computer programmes may be configured to carry out particular operations or actions thanks to instructions which, when they are executed by a data processing appliance, oblige the appliance to carry out the actions.

The invention further pertains to a computer programme comprising programme code instructions which, when they are executed by a computer, cause the implementation of a method for logging microservices according to the invention.

The invention further pertains to a logging support on which is logged a computer programme for the determination of an estimated duration before a technical incident in a computer infrastructure according to the invention.

The invention further pertains to a system for logging microservices in a platform for unified governance of a plurality of intensive computing solutions, said intensive computing solutions comprising at least two solutions selected from: a high performance computing server, a server dedicated to supervised or unsupervised learning, and a server dedicated to quantum computations;

said system for logging new microservices comprising:
A security repository configured to memorise identification information of new microservices;
A service register configured to memorise data for accessing the resources of new microservices;
A token security microservice, configured to:
Receive a join request from a new microservice, said join request comprising a unique identifier of the new microservice,
Verify the unique identifier of the new microservice from information memorised in the security repository,
Generate an authentication token and transmit said authentication token to the new microservice; and
a logging module, configured to:
Receive a logging request from a new microservice, said logging request comprising data for accessing the resources of the new microservice and the generated authentication token; and
Log, when the authentication token is validated, data for accessing the resources of the new microservice on the service register.

Such a computer system makes it possible to integrate in a secure and transparent manner a new microservice in a unified governance platform. The new microservice will be able, after its logging, to accept requests processed by the unified governance platform. In particular, the proxy microservice will be able to access with the logging module data for accessing the resources of the new microservice such as endpoints.

According to other optional characteristics of the computer system, said system may optionally comprise one or more of the following characteristics, alone or in combination:
the token security microservice is configured to access a plurality of directories, preferably at least directories of LDAP, Active Directory and Kerberos type. The plurality of possibilities offered is permitted by the structure of the system and makes it possible to confer strong adaptability to the invention.
the token security microservice may be configured to verify the validity of the generated authentication token.

Other advantages and characteristics of the invention will become clear on reading the following description, given as an illustrative and non-limiting example, with reference to the appended Figures.

Figure 1:
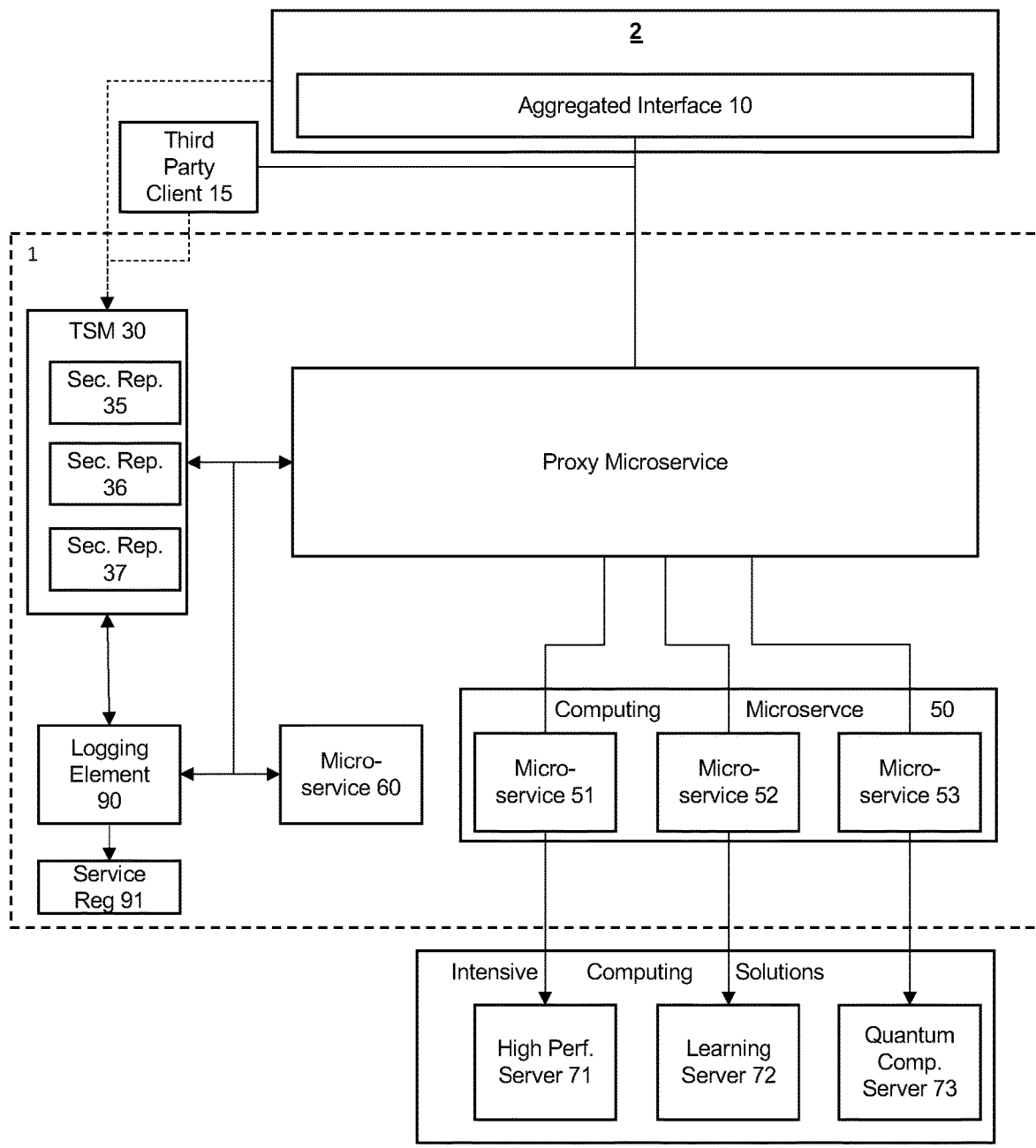
FIG. 1 represents a diagram of a computer system for logging microservices according to the invention.

Aspects of the present invention are described with reference to flow charts and/or to functional diagrams of methods, appliances (systems) and computer programme products according to embodiments of the invention.

In the figures, the flow charts and the functional diagrams illustrate the architecture, the functionality and the operation of possible implementations of systems, methods and computer programme products according to various embodiments of the present invention. In this respect, each block in the flow charts or block diagrams may represent a system, a device, a module or a code, which comprises one or more instructions that can be executed to implement the specified logic function(s). In certain implementations, the functions associated with the blocks may appear in a different order to that indicated in the figures. For example, two blocks shown successively may, in fact, be executed substantially simultaneously, or the blocks may sometimes be executed in the reverse order, depending on the functionality involved. Each block of the schematic diagrams and/or the flowchart, and combinations of blocks in the schematic diagrams and/or the flow chart, may be implemented by special hardware systems that execute specific functions or acts or make combinations of special hardware and computer instructions.

DETAILED DESCRIPTION OF THE INVENTION

In the remainder of the description, the expression "management of authorisations" corresponds, in the sense of the invention, to the capacity of managing, as a function of predetermined rules, access to intensive computing solutions on the one hand and the rights of users regarding these solutions such as read, write, copy, execution, modification, and total control. In general, the authorisation encompasses the permission policies, the management of accesses, identities and authentication.

The expression "intensive computing solution" preferably corresponds to computer infrastructures capable of executing intensive or high performance computations such as: High Performance Parallel Computing, Artificial Intelligence, Deep Learning, quantum computing and quantum computing simulation. Quantum computing widely refers to any computing solution using quantum effects in order to find solutions to computing problems.

The term "microservice" corresponds to an applicative chain generally comprising a plurality of applications capable of executing one or more tasks. The microservices may be connected together through API such as an API REST. The presence within the scope of the invention of microservices makes it possible to confer great modularity and scalability to the solution notably with regard to the involvement of potentially very different intensive computing solutions.

The term "portlet" may designate connectable user interface software components that are managed and displayed in a web portal. A portal page may be displayed as a collection of non-overlapping portlet windows, where each portlet window displays a portlet. Consequently, a portlet (or a collection of portlets) is similar to an application based on the Web that is hosted in a portal.

The expression "Web portal" or more simply "Portal" may designate an access tool for accessing different types of information and applications via a client system from the resources of the network. A tool for displaying a portal page may be a Web browser. However, a portal may also be integrated in other applications. The portals in the sense of the invention are advantageously capable of presenting data of several sources such as Web applications in a single aggregated Web interface or browser. Moreover, a portal offers the possibility of displaying portlets in the aggregated interface. The configuration of the portal may comprise a portal definition with for example a file comprising extensible markup language (XML), portlet definition files for all the portlets associated with the portal, Java server pages (JSP), Web application descriptors, images such as graphic interchange format files (GIFs), deployment descriptors, configuration files, Java archive files (JAR) which contain logic and formatting instructions for the portal application, and all the other files necessary for a desired portal application.

The term "request" may designate an information request, generally identified by a "link" on a portal page. A request may be initiated by "clicking" on a displayed symbol associated with the "link".

The expression "aggregated interface" or "aggregation interface" may designate, in the sense of the invention, a graphic human-machine interface benefiting from a method for gathering and aggregating information on the resources of the network, as well as the organisation of information objects according to one of the characteristics of a display screen.

The expression "human-machine interface" in the sense of the invention corresponds to any element allowing a human being to communicate with a computer in particular and, without this list being exhaustive, a keyboard and means making it possible in response to orders entered on the keyboard to carry out displays and potentially to select, with the help of a mouse or touchpad, elements displayed on the screen. Another exemplary embodiment is a touch screen making it possible to select directly on the screen elements touched by the finger or an object and potentially with the possibility of displaying a virtual keyboard.

"Process", "compute", "execute", "determine", "display", "extract", "compare" or more widely "executable operation" is taken to mean, in the sense of the invention, an action carried out by a device or a processor except if the context indicates otherwise. In this respect, the operations relate to actions and/or processes of a data processing system, for example a computer system or an electronic computer device, which manipulates and transforms the data represented as physical (electronic) quantities in the memories of the computer system or other devices for storage, transmission or display of information. These operations may be based on applications or software.

The terms or expressions "application", "software", "programme code", and "executable code" signify any expression, code or notation, of a set of instructions intended to cause a processing of data to carry out a particular function directly or indirectly (e.g. after an operation of conversion to another code). Examples of programme code may include, without being limited thereto, a sub-programme, a function, an executable application, a source code, an object code, a library and/or any other sequence of instructions designed for execution on a computer system.

"Module" is taken to mean, in the sense of the invention, a device, a physical or virtual element being able to form part of a system and being able to have its own internal mechanisms (pilots and peripherals, etc.), capacities and functionalities. A module in the sense of the invention may correspond to an extension, a card, a code, a pilot, a programme, a software, a disk, a file, an extension, a computer equipment, a component or peripheral, etc.

"Processor" is taken to mean, in the sense of the invention, at least one hardware circuit configured to execute operations according to instructions contained in a code. The hardware circuit may be an integrated circuit. Examples of processor comprise, without being limited thereto, a central processing unit, a graphic processor, an application specific integrated circuit (ASIC) and a programmable logic circuit.

"Coupled" is taken to mean, in the sense of the invention, connected, directly or indirectly with one or more intermediate elements. Two elements may be coupled mechanically, electrically or connected by a communication channel.

The expression "new microservice", in the sense of the invention, may correspond to a functional assembly, preferably autonomous, being able to couple software and hardware, and exposing resources through a communication interface such as an API REST that other functional assemblies could consume. In particular, a new microservice corresponds to a functional assembly not yet having been logged at the level of the logging module of the governance platform or instead a functional set having been updated such that the access data logged beforehand require updating.

The expressions "resources of a microservice" or "content of a microservice", in the sense of the invention, may correspond to data generated or transmitted by the microservice or instead to functions implemented by the microservice. In particular, this could correspond within the scope of a unified governance of a plurality of intensive computing solutions to information exchanged with the scheduler(s), business data generated and shared by different computing solutions such as data for executing intensive computing solutions 70. The data for executing intensive computing solutions 70 may for example correspond to:

Computation results accessible and processable by several computing microservices:

This allows the user client 2 to have at its disposal the results of computations processed by the intensive computing solutions.

Energy consumption measurements of intensive computing solutions:

This allows the user client 2 to have at its disposal a datum summarising the anticipated, or real, energy consumption of intensive computations planned on an intensive computation solution.

Measurements of use of resources (network passband, storage inputs-outputs, memory, CPU, GPU, etc.):

Thus, instead of having available data of use of resources as a function of the different intensive computing solutions.

Index data of use of intensive computing processes: Beyond the measurement of use of resources, it is advantageous to be able to receive an index value of use of intensive computing processes for each of the intensive computing solutions used. For example, this index value may be computed from durations of use as well as from capacities used. The index value of use of intensive computation processes may for example be next used to compute a cost of using each of the intensive computation processes.

Duration data before completeness of the computations: For example a duration value reflecting the end of operations for each of the intensive computing solutions.

In a preferred manner, the data for executing intensive computing solutions 70 is selected from:
 Computation results accessible and processable by several computing microservices;
 Measurements of energy consumption of intensive computing solutions;
 Measurements of use of resources;
 Index data of use of intensive computing processes; and
 Duration data before completeness of the computations.

In a more preferred manner, the data for executing intensive computing solutions 70 is selected from:
 Computation results accessible and processable by several computing microservices;
 Measurements of energy consumption; and
 Measurements of use of resources.

Thus, as will be appreciated by those skilled in the art, aspects of the present invention may be realised as device, system, method or computer programme product. Consequently, aspects of the present invention may take the form of an entirely hardware embodiment, an entirely software embodiment (comprising a microsoftware, a resident software, a microcode, etc.) or a particular embodiment such as a "circuit", "module" or "system". Moreover, aspects of the present invention may take the form of a computer programme product incorporated in one or more computer readable supports having a computer readable programme code incorporated thereon.

Any combination of one or more computer readable supports may be used. In the context of this document, a computer readable support may be any tangible support that can contain, or store, a programme to use by or in relation with a system for executing instructions, appliance or device. A computer readable support may be, for example, but without being limited thereto, an electronic, magnetic, optic, electromagnetic, infrared or semiconductor system, appliance or device, or any appropriate combination of that which precedes. More specific examples (a non-exhaustive list) of the computer readable storage support could comprise: a hard disk, a random access memory (RAM).

A computer programme code for carrying out operations for aspects of the present invention may be written in any combination of one or more programming languages, including an object oriented programming language such as Java, C++ or similar, the "C" programming language or similar programming languages, a script language such as Perl, or similar languages, and/or functional languages such as Meta Language. The programme code may be executed entirely on the computer of a user, in part on the computer of a user and in part on a remote computer or entirely on a remote computer or server. In the latter scenario, the remote computer may be connected to the computer of a user by any type of network, including a local area network (LAN) or a wide area network (WAN).

These computer programme instructions may be stored on a computer readable support being able to supervise a computer device (e.g. computer, server, etc.), such that the instructions stored in the computer readable support produce a computer device configured to implement the invention.

In the remainder of the description, the same references are used to designate the same elements.

As has been mentioned, numerous intensive computing solutions available and accessible to occasional users exist. However, no platform exists making it possible to unify access to a plurality of intensive computing solutions in a homogenous, transparent and secure manner. Thus, the inventors have proposed a computing solution enabling, via the use of a plurality of microservices, unified governance and an aggregated interface for access to a variety of services of third party suppliers of intensive computing solutions.

However, within the scope of a unified governance platform, it is necessary to be able to integrate a plurality of new microservices, in an easy and secure manner. To do so, the inventors have proposed a solution implementing notably a token security microservice, and a logging module. The token security microservice is in charge of the management of the functionalities of security and authentication to secure the system such as the authentication of users and/or developers, the supply of different access levels to the system based on the security identification information of users and/or developers. The logging module is for its part in charge of the logging of new microservices, the monitoring of their state, the memorisation of data for accessing the resources proposed by these microservices and the interaction with a proxy microservice being able to access these microservices.

In this context, the invention pertains in particular to a method for logging microservices in a platform for unified governance of a plurality of intensive computing solutions.

In particular, as is illustrated in FIG. 1 and as will be described hereafter, the method for logging microservices and in a more general manner the unified governance may be ensured by a governance platform comprising a proxy microservice 20, a token security microservice 30, at least one security repository 35, a logging module 90, and a service register 91.

The logging of microservices will make it possible, thanks to the method according to the invention, to manage a plurality of different microservices in complete security and to do so without interruption of service for a multitude of users of the unified governance platform. Indeed, a method for logging microservices according to the invention is advantageously implemented within the scope of a unified governance of a plurality of intensive computing solutions 70. The intensive computing solutions 70 within the scope of the present invention are for example selected from: a high performance computing server 71, a server dedicated to supervised or unsupervised learning 72, and a server dedicated to quantum computations 73, in particular to quantum computing simulations. In particular, a server dedicated to supervised or unsupervised learning 72 may be a server dedicated to supervised or unsupervised deep learning. In a preferred manner, the intensive computing solutions for which the logging or the management of authorisations is implemented comprise at least two of the solutions listed above, in a more preferred manner at least three of the solutions listed above.

Intensive computation solutions 70 are advantageously coupled to computing microservices 50. The computing microservices 50 within the scope of the present invention are for example selected from: a microservice 51 connected to a high performance computing server 71, a microservice 52 connected to a server dedicated to supervised or unsupervised learning 72, and "n" microservices 53 connected to a server dedicated to quantum computations 73, in particular to quantum computing simulations.

Thus, the method for logging microservices is implemented at least in part by a governance platform, that is to say that the method may for example be implemented by a computer device such as a computer server for the unified governance of a plurality of intensive computing solutions 70 in combination with at least one user client 2, preferably several user clients 2 and intensive computing solutions 70.

Moreover, each of the user clients 2 may comprise an aggregated interface 10 advantageously composed of a plurality of portlets, each portlet being associated with an intensive computing solution 70 such as a high performance computing server 71, a server dedicated to supervised or unsupervised learning 72, a server dedicated to quantum computations 73.

Figure 2:
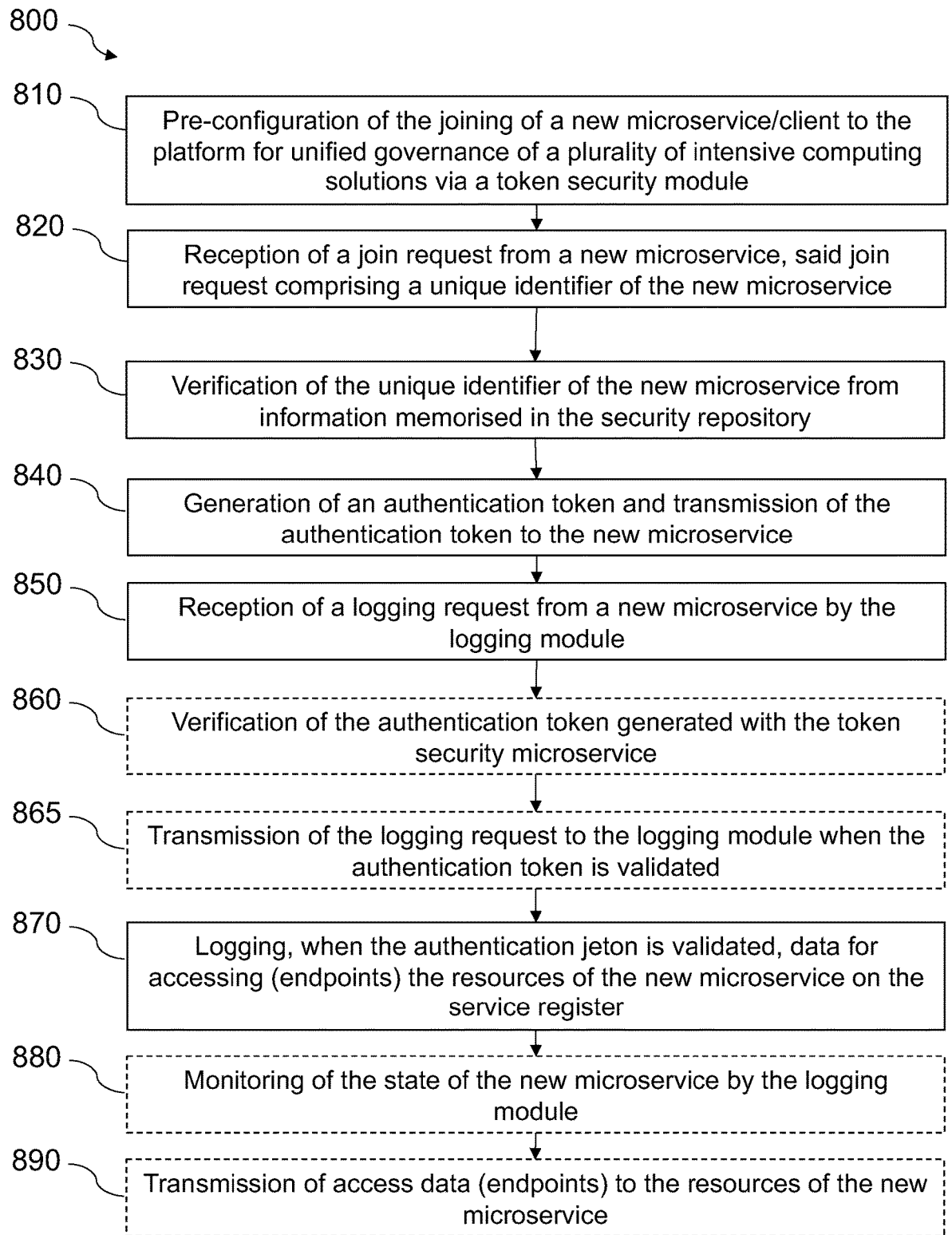
FIG. 2 represents a schematic illustration of a method for logging microservices according to the invention. The steps in dotted lines are optional.

As is illustrated in FIG. 2, a method 800 for logging microservices according to the invention comprises the steps of: reception 820 of a join request from a new microservice 60; verification 830 of a unique identifier of the new microservice IDMS; generation 840 of an authentication token and transmission of the authentication token to the new microservice by the token security microservice 30; reception 850 of a logging request from a new microservice; and logging 870 data for accessing the resources of the new microservice.

The method 800 for logging microservices according to the invention may also advantageously integrate steps of work submission, work surveillance, suspension and restart of works and modification of the work parameters.

In addition, as will be detailed hereafter, the method according to the invention may advantageously integrate an authorisation management procedure 100 and an action command management procedure 300.

A method 800 for logging microservices according to the invention may comprise a step of pre-configuration 810 of the joining of a new microservice with the unified governance platform. This corresponds to a declaration of a new microservice with the unified governance platform. This declaration may in particular be realised with the token security microservice 30 and notably of one of its security repositories 35.

During this step, a user and in particular an administrator will be able to be authenticated with the governance platform then to modify adequate registers, such as the security repository 35 in such a way as to declare the possible existence (which can be optionally joined to the solution) of a new microservice. For example, the new microservice could be logged with the logging module by an administrator in order to be known and authorised to connect to other services (proxy module, token security microservices, aggregated interface, etc.).

A method 800 for logging microservices according to the invention comprises a step of reception 820 of a join request from a new microservice 60. The join request may be sent by a third party computer device or by an authenticated client such as a client used by an administrator of the governance platform. In a preferred manner, the join request is sent by a computer device supporting the new microservice.

This join request is preferably received by the token security microservice 30. It may be transmitted directly from the new microservice or from a computer device supporting the new microservice to the token security microservice 30. However, it may alternatively transit between the new microservice and the token security microservice 30 via the proxy microservice 20.

This join request comprises a unique identifier of the new microservice IDMS. The join request may advantageously comprise a password of the new microservice. In this case, the token security microservice may also be configured to verify the password of the new microservice.

In a preferred manner, the join request further comprises an identifier of an administrator of the unified governance platform and a password for said administrator of the unified governance platform. In this case, the token security microservice may also be configured to verify the identifier of the administrator of the unified governance platform and its password.

A method 800 for logging microservices according to the invention comprises a step of verification 830 of the unique identifier of the new microservice IDMS. This step is preferably carried out by the token security microservice 30. Moreover, this verification may be done from information memorised in the security repository 35.

This step of verification 830 may also comprise if need be the verification of the password(s), the identifier of an administrator of the unified governance platform or instead an authentication token associated with an administrator of the unified governance platform.

A method 800 for logging microservices according to the invention comprises a step of generation 840 of an authentication token and transmission of the authentication token to the new microservice. This step is preferably carried out by the token security microservice 30.

The authentication token generated and transmitted to the new microservice will enable the new microservice, within the scope of the present invention, to be executed and to propose its functions through the platform.

A method 800 for logging microservices according to the invention comprises a step of reception 850 of a logging request REQE from a new microservice.

The logging request REQE may be sent by a third party computer device or by an authenticated client 2 such as a client used by an administrator of the governance platform. In a preferred manner, the logging request REQE is sent by a computer device on which the new microservice is executed.

This logging request REQE is preferably received by the logging module 90. It may be transmitted directly from the new microservice or from a computer device on which the new microservice is executed to the logging module 90. However, alternatively, it may transit between the new microservice and the logging module 90 via the proxy microservice 20.

This logging request REQE comprises data (endpoints) for accessing the resources of the new microservice. These data for accessing the resources of the new microservice may for example take the form of one or several "endpoints". The logging request REQE also comprises in a preferred manner the generated authentication token.

As is illustrated in FIG. 2, a method 800 for logging microservices according to the invention may advantageously comprise a step of verification 860 of the generated authentication token with the token security microservice 30. This step is preferably carried out by the token security microservice 30. Moreover, this verification may be done from information memorised in the security repository 35.

This step of verification 860 of the authentication token may also comprise if need be the verification of one or several passwords and/or identifiers. However, the use of an authentication token advantageously makes it possible to dispense with the verification of passwords and identifiers.

Moreover, a method 800 for logging microservices according to the invention may then comprise, when the authentication token is validated, a step of transmission 865 of the logging request REQE to the logging module 90 by the proxy microservice 20. Indeed, the logging request may be transmitted by the new microservice to the proxy microservice then it is the proxy microservice 20 that takes care of carrying out the step of verification 860 of the authentication token with the token security microservice 30.

In this case, this logging request received by the proxy microservice 20 and validated by the token security microservice is next transmitted to the logging module 90.

A method 800 for logging microservices according to the invention may comprise, when the authentication token is validated, a step of validation of the logging request by the logging module 90.

A method 800 for logging microservices according to the invention comprises a step of logging 870 data for accessing the resources of the new microservice. This step is preferably carried out by the logging module 90. Moreover, this logging may be done on the service register 91 or on any data memory support.

This logging step 870 is particularly implemented when the authentication token is validated preferably by the token security microservices.

A method 800 for logging microservices according to the invention may comprise a step of monitoring the state 880 of the new microservice. This step is preferably carried out by the logging module 90.

Thus, the logging module may also be configured to carry out a management of microservices in such a way as to determine if they are broken down, working, disconnected, in error. In a preferred manner, a method according to the invention may further comprise a step of continuously updating the service register 91 and in particular the data for accessing the resources.

This monitoring step 880 comprises in particular: a surveillance of the state of a microservice (absent/deactivated/stopped/started); a change of state of a microservice (absent/deactivated/stopped/started); a memorisation of the location of a microservice; and/or a memorisation of the services (endpoints) proposed by a microservice.

Once a new microservice has been logged within the unified governance platform, it could be the object of access or content requests, for example by the proxy microservice. Indeed, the new microservice is preferably configured to supply on request contents to other modules or microservices.

Thus, a method 800 according to the invention may comprise a step of transmission 890 of data for accessing the resources of the new microservice by the logging module 90 to the proxy microservice 20.

A new microservice in operation will then be able to be contacted by portlets of an aggregated interface that references it.

In a preferred manner, the new microservice is made accessible to a user client 2 at the level of an aggregated interface and a method according to the invention comprises a step of transmission of content data from the new microservice to the aggregated interface.

In particular, as will be detailed hereafter, a user client 2 will be able to make a service request with the proxy microservice which, after verification of the permissions of said user client 2, will be able to acquire with the logging module 90 data for accessing the resources of the new microservice such as endpoints responding to the service request.

Figure 3:
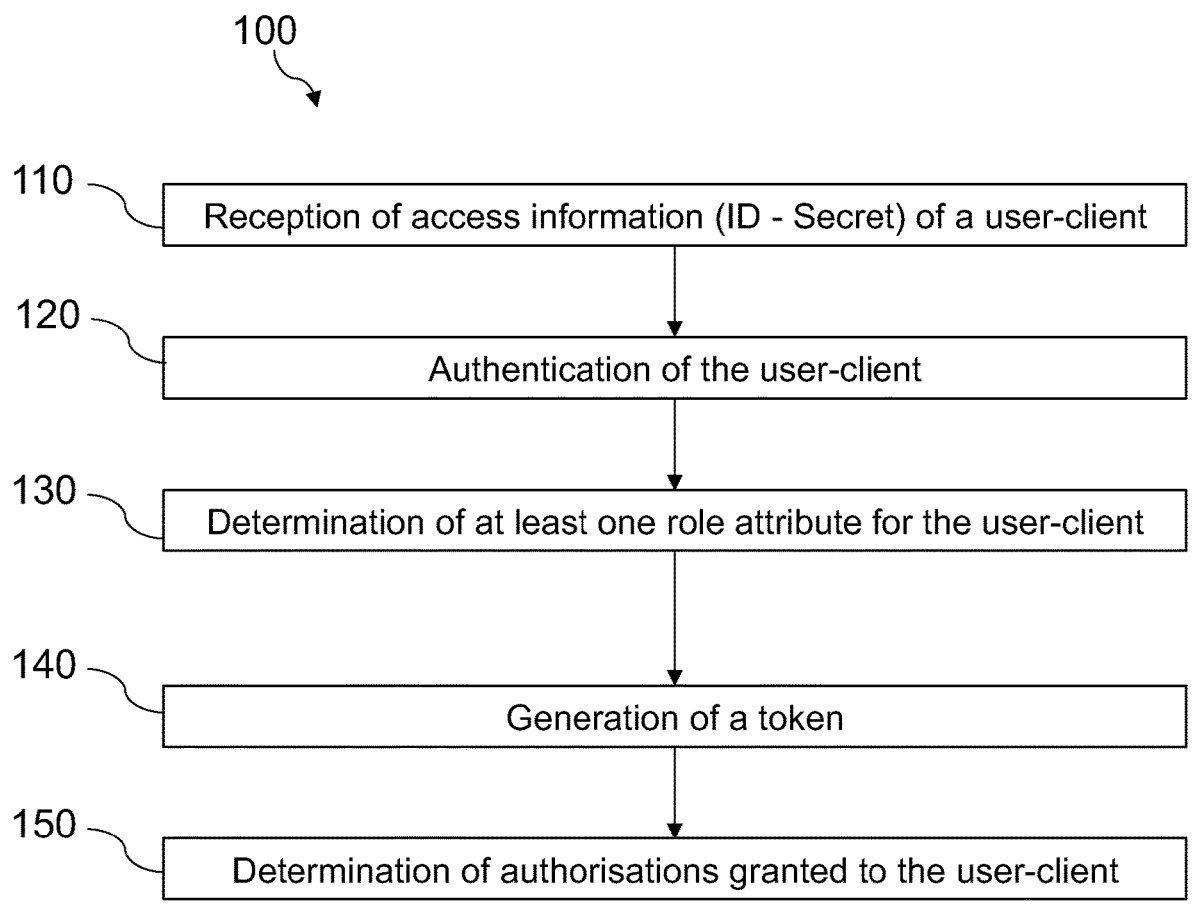
FIG. 3 represents a diagram of an authorisation management procedure according to an embodiment of the invention.

As is illustrated in FIG. 3, a method according to the invention may also comprise a procedure 100 for managing authorisations granted to a user client 2 or a third party client 15. Within the scope of this authorisation management procedure 100, the computer system 1 may further comprise an authorisation repository.

Such an authorisation management procedure 100 according to the invention comprises the steps of reception 110 of access information from a user client 2 or from a third party client 15, authentication 120 of the user client 2 or the third party client 15, determination 130 of at least one role attribute for the user client 2 or the third party client 15, generation 140 of a token, and determination 150 of authorisations granted to the user client 2 or to the third party client 15.

Moreover, an authorisation management procedure 100 according to the invention may comprise steps of work submission, work surveillance, suspension and restart of works and modification of the work parameters.

Advantageously, an authorisation management procedure 100 according to the invention may comprise a step of modification of the aggregated interface as a function of authorisations granted to the user client or to the third party client 15. Indeed, once identified, the user client will be able to benefit from new functionalities and thus from an aggregated interface coherent with these functionalities.

Thus, the procedure 100 for managing authorisations according to the present invention comprises a reception 110 of access information from a user client 2 or from a third party client 15.

In a preferred manner, at least part of the access information is generated at the level of the aggregated interface 10 of the user client 2 or the third party client 15.

In particular, the reception may be done by the token security microservice 30. However, in a preferred manner, this information is transferred from the user client or from the third party client 15 directly or indirectly to the proxy microservice 20, then the proxy microservice 20 transfers this access information, modified or not, to the token security microservice 30.

The access information may for example take the form of a message comprising identification data of the user client 2 or the third party client 15.

Thus, the authorisation management procedure 100 according to the present invention comprises a step of authentication 120 of the user client 2 or the third party client 15.

The authentication may for example be carried out by any module capable of implementing a single authentication protocol (SSO for "Single Sign On"). Different protocols may be used to carry out the authentication of the user client 2 or the third party client 15. In a preferred manner, the authentication 120 of the user client 2 is done according to a protocol selected from the known OAuth protocol allowing a third party application to access a web service, and SAML for "Security Assertion Markup Language", concerning a computing standard defining a protocol for exchanging information linked to security and enabling the single authentication of a user.

Advantageously, the authentication 120 of the user client 2 or the third party client 15 is not carried out by the proxy microservice 20. In a more preferred manner, the authentication is carried out by a token security microservice 30. There is thus a delegation, by the proxy microservice 20, of the control of identification, authentication and attribution of role to the token security microservice 30.

In particular, the token security microservice 30 is configured to access a plurality of directories or security repositories 35, 36, 37, preferably at least LDAP (Lightweight Directory Access Protocol) type directories, a service for storage and management of an information system such as the known solution Active Directory® and an authentication system such as the known authentication protocol Kerberos®. The security repository 35,36,37 may correspond to a support for storing keys and/or tokens, such as a data base, a data file or any other secure storage system in a memory. This is generally a secure support making it possible to store the names, passwords, roles and authorisations of users. Preferably, it comprises a role matrix and a subscription matrix.

Moreover, the token security microservice 30 advantageously implements an OAuth type and in particular an OAuth 2.0 type protocol.

In a preferred manner, although the token security microservice 30 forms part of a logging computer system 1 according to the invention, it is advantageously hosted on one or more different computer devices (e.g. servers), distinct from the computer device(s) hosting the proxy microservice 20 and/or the computing microservices 50, 51, 52, 53.

Numerous possible alternatives exist in the implementation of the authentication 120 of the user client 2 or the third party client 15. Advantageously, the token security microservice 30 may supply a very wide variety of authentication protocols but is not able to supply security controls with optimised fine grains. To remedy this situation, the inventors have proposed delegation uniquely of a control sub-assembly to the token security microservice 30. If the token security microservice 30 cannot provide security controls sufficiently fine for intensive computing solutions, these controls will be entrusted to the computing microservices.

Moreover, the proxy microservice may log information supplied by the user client in a logging library and store this information in a database.

The authentication 120 of the user client 2 or the third party client 15 may also correspond to an authentication of a developer client. Advantageously, the token security microservice 30 will be invoked each time that a third party contacts the proxy microservice and requires an authentication.

Thus, the authorisation management procedure 100 according to the present invention comprises a step of determination 130 of at least one role attribute for the client.

In a preferred manner, the determination 130 is carried out by the token security microservice 30. The determination 130 of at least one role attribute for the client is for example carried out from access command information and data memorised in a security repository 35,36,37.

Once the user client has been authenticated, the method according to the invention is going to enable the generation of a token allowing temporary access to resources managed by the computing microservices. In particular, the method according to the invention is based on authorisations controlled via pre-determined roles or role attributes.

On the basis of predetermined rules, a role is selected for a client and inscribed in an identification token of the client.

The token may for example take the form of a JWT (JSON Web Token). It contains requests concerning the identity of the authenticated client. Alternatively, the method according to the invention may implement a token of PASETO (Platform-Agnostic Security Tokens) type, a Branca type token or instead a Macaroons (cookies with contextual caveats for decentralised authorisation in the cloud according to Google®) type token.

In a preferred manner, the authentication 120 and the determination 130 of at least one role attribute for the user client 2 or the third party client 15 is carried out in accordance with the OAuth 2.0 protocol.

In particular, the token security microservice 30 processes a message from the proxy microservice 20 and extracts the access request. The token security microservice 30 next compiles the list of access rights granted for the client and requests a security token for the granted rights.

A token is then generated and transmitted to the proxy microservice 20 which transmits it in turn to the user client.

Thus, the authorisation management procedure 100 according to the present invention comprises a step of generation 140 of a token. In particular, this generated token enables access to all the intensive computing solutions (i.e. for which the user client has authorisations) accessible to said client as a function of the at least one determined role attribute.

However, this token generally does not make it possible to define finely the authorisations granted to the client for one or more intensive computing solutions. In a more preferred manner, the generated token comprises access rights to one or more intensive computing solutions as well as a role characteristic of the client.

Thus, the authorisation management procedure 100 according to the present invention then comprises a step of determination 150 of authorisations granted to the user client 2 or to the third party client 15.

Advantageously, the determination of authorisations is based on the at least one determined role attribute and data contained in an authorisation repository.

The determination 150 of authorisations may for example be carried out by the proxy microservice or a computing microservice.

In a preferred manner, the determination 150 of authorisations is carried out by at least one computing microservice 50, 51, 52, 53.

As an example, an intensive computing solution may have more than 50 functionalities which have to be multiplied by a distribution as a function of the roles of the user and the solutions. Thus, it is generally several hundreds of authorisations that must be managed. Within the scope of the invention, a computing microservice is thus advantageously coupled to an authorisation catalogue or authorisation repository.

This authorisation catalogue or repository may be implemented as a table in the data base of the backend (either in its own microservice, or in a dedicated microservice).

Thus, at least part of the control for accessing and managing authorisations is implemented at the level of each of the computing microservices.

Thanks to this, it will be possible to respond to the very fine needs of authorisations of intensive computing solutions while ensuring a high level of security supplied by the use of authentication tokens.

Figure 4:
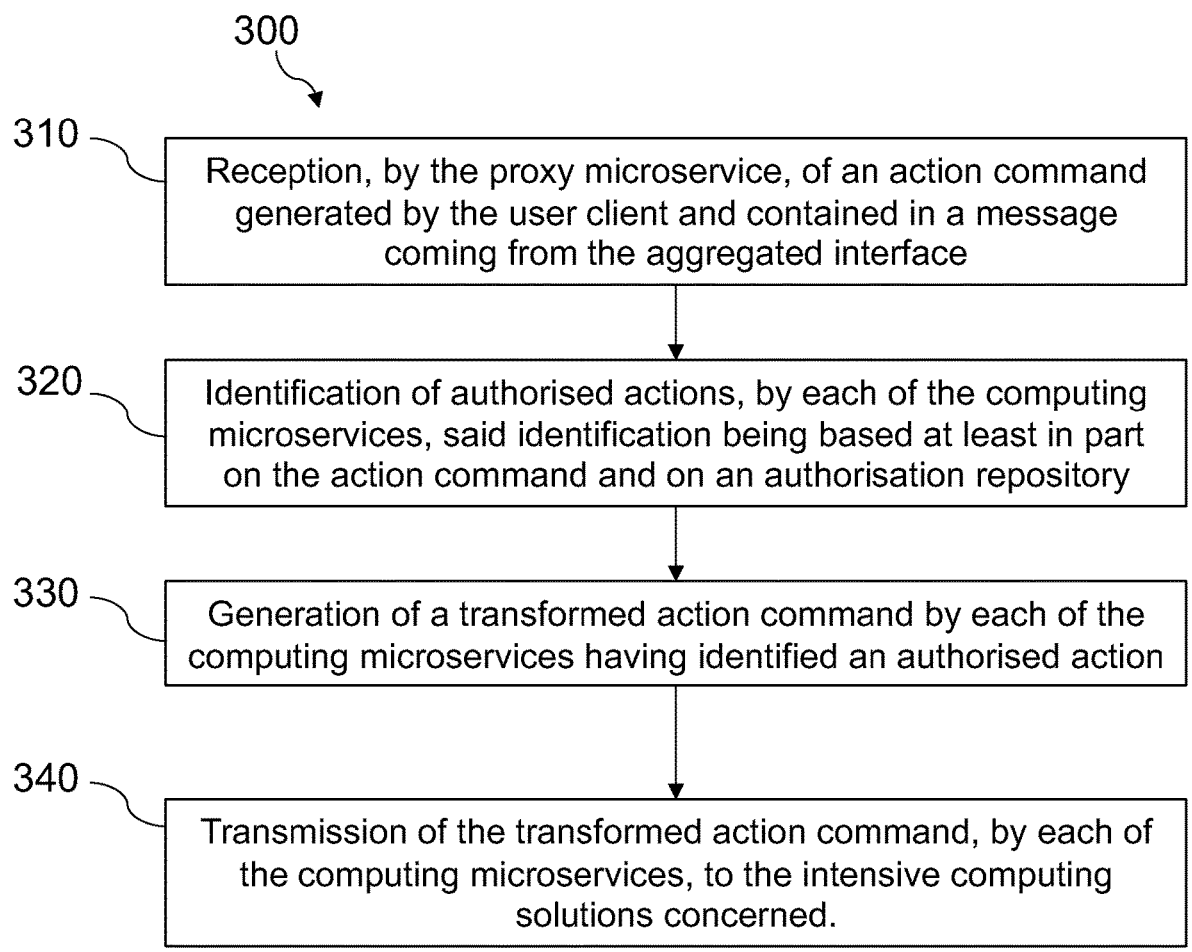
FIG. 4 represents a diagram of an action command management procedure according to an embodiment of the invention.

As is illustrated in FIG. 4, a method according to the invention may comprise an action command management procedure 300 and may comprise a reception 310, by the proxy microservice 20, of an action command generated by the user client 2. This action command may for example be contained in a message coming from the aggregated interface 10.

The procedure 300 may also comprise an identification 320 of actions authorised by each of the microservices such as computing microservices 50,51,52,53. This identification is preferably based at least in part on the action command and on an authorisation repository which will be described hereafter. Thus, from a message sent by an aggregated interface 10 and comprising an action command, the computing microservices may, thanks to the authorisation repository, determine if this action command refers to one or more actions authorised for a given user client 2.

The procedure 300 also comprises generation 330 of an action command transformed by each of the microservices having identified an authorised action. Indeed, whereas the action command generated by the aggregated interface has taken a form being able to be addressed by all the microservices thanks for example to a shared repository of key words, the microservices may secondly generate a transformed action command which could be addressed for example to the intensive computing solutions. Given that these solutions are independent, the transformed action commands will be generally different as a function of the microservices.

The procedure 300 may also comprise a transmission 340 of the transformed action command, by each of the microservices, to the intensive computing solutions 70 concerned or to the aggregated interface.

Figure 5A:
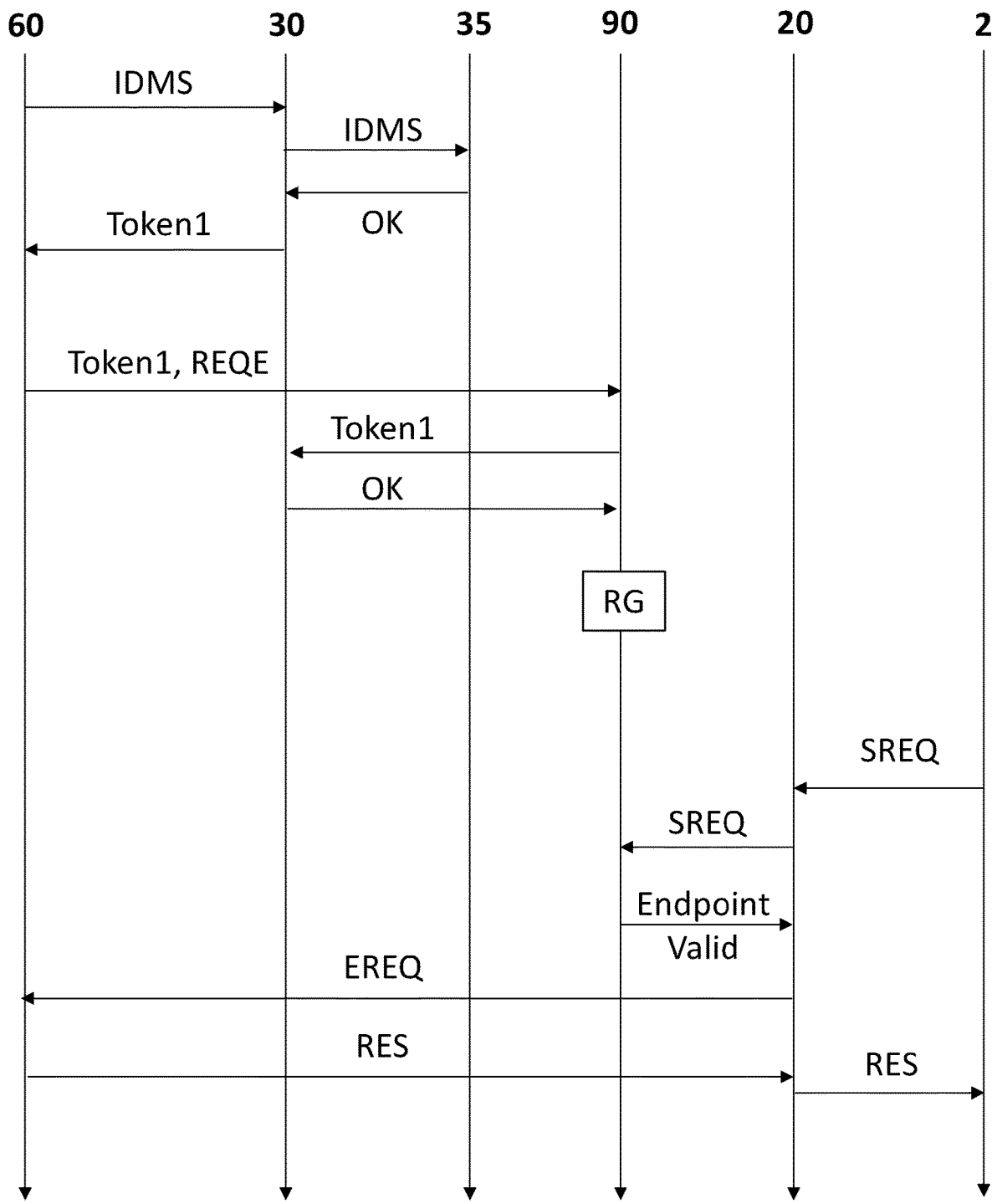
FIG. 5A represents a diagram of a mode of operation of a computer system for logging microservices according to an embodiment of the invention.

An exemplary embodiment of a computer system for logging microservices according to the invention is illustrated in FIG. 5A.

In this exemplary embodiment, a new microservice 60 transmits to a token security microservice 30 a join request comprising a unique identifier of the new microservice IDMS. The token security microservice 30 verifies this unique identifier of the new microservice with a security repository 35. This security repository 35 will have for example been completed initially by an administrator of the governance platform.

Once the unique identifier of the new microservice is OK, the token security microservice 30 transmits an authentication token1 to the new microservice 60.

The new microservice 60 may then transmit a logging request REQE accompanied by the authentication token1 to the logging module 90. The logging module 90 could verify with the token security microservice if the authentication token1 is valid and if the new microservice 60 is authorised to contact the logging module 90.

In the event of OK validation, the logging module 90 will be able to carry out the logging of the new microservice 60 and in particular the logging of data for accessing the new microservice, such as represented by the reference RG in the figures.

Once the new microservice has been logged, a user client 2 will be able to send a service request SREQ preferably with the proxy microservice 20. The proxy module 20 could at this stage verify if the user client has the authorisations necessary for the use of this service.

Next, the proxy microservice 20 will be able to command a service request SREQ with the logging module 90. The logging module will then be able to carry out several verifications such as: verification of the capacity of a service to be ensured by a logged microservice; verification of the availability of the service; and/or verification of the authorisation of the user client 2. For example, if the service may be ensured by a logged microservice and if the user client 2 has authorisations then the logging module 90 will send, to the proxy microservice 20, Endpoint Valid access data to the sought after microservice.

Next, in certain embodiments, the proxy microservice 20 will be able to transmit to the microservice concerned, for example the new microservice 60, a request concerning the access data received EREQ then to transmit the resources or contents RES obtained to the user client 2, for example via an aggregated interface 10.

Figure 5B:
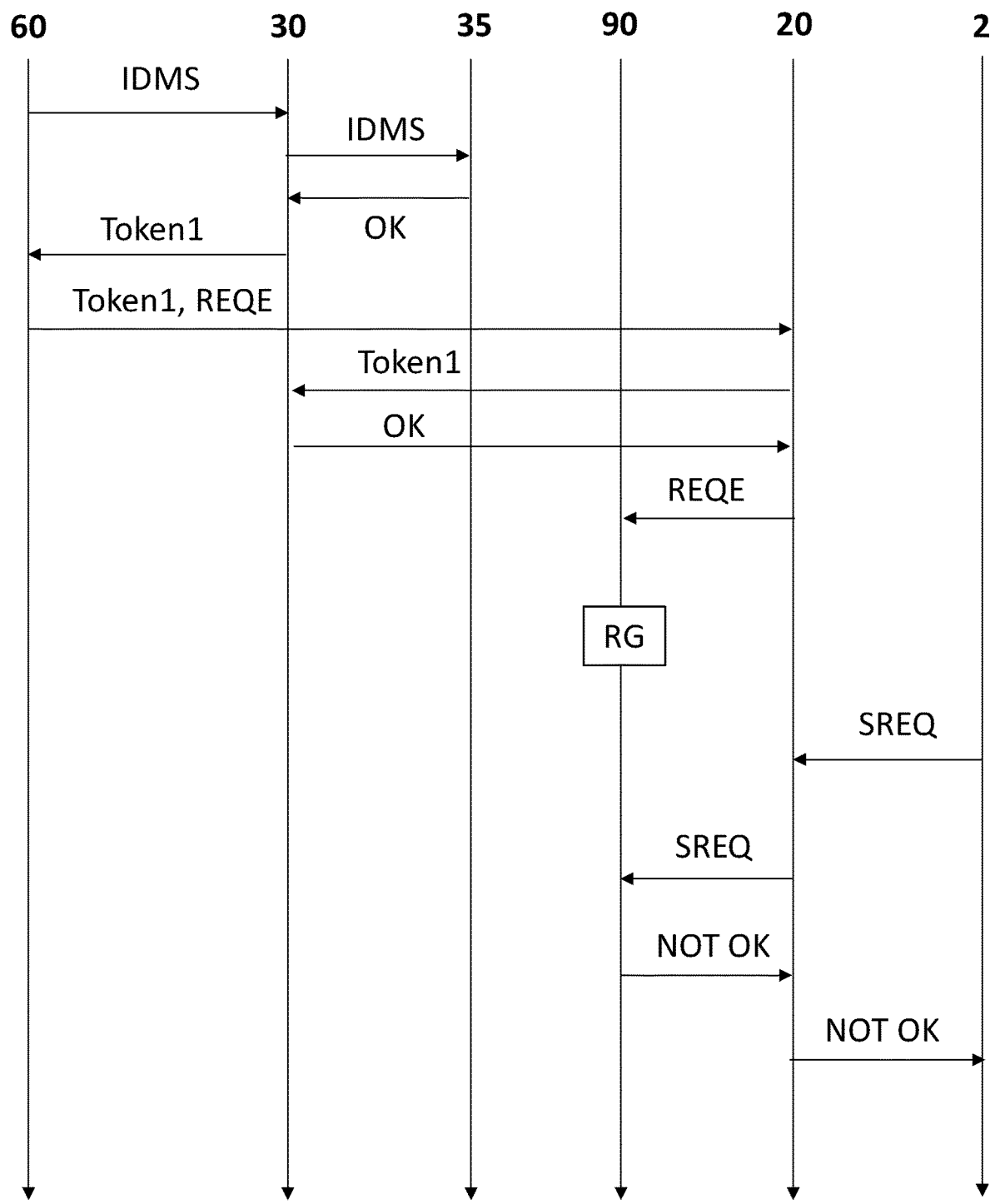
FIG. 5B represents a diagram of a mode of operation of a computer system for logging microservices according to another embodiment of the invention.

Another exemplary embodiment of a computer system for logging microservices according to the invention is illustrated in FIG. 5B.

As previously, in this exemplary embodiment, a new microservice 60 transmits to a token security microservice 30 a join request comprising a unique identifier of the new microservice IDMS. Once the unique identifier of the new microservice is OK, the token security microservice 30 transmits to the new microservice 60 an authentication token1.

The new microservice 60 may then transmit a logging request REQE accompanied by the authentication token1 to the proxy microservice 20. The proxy microservice 20 will be able to verify with the token security microservice if the authentication token1 is valid and if the new microservice 60 is authorised to contact a logging module 90.

In the event of OK validation, the proxy microservice 20 will be able to transmit to the logging module 90 the logging request REQE and the logging module 90 will be able to carry out the logging of the new microservice 60 and in particular the logging of data for accessing the new microservice, such as represented by the reference RG in the figures.

As previously, once the new microservice has been logged, a user client 2 will be able to send a service request SREQ preferably with the proxy microservice 20. Next, the proxy microservice 20 will be able to command a service request SREQ with the logging module 90.

If the service cannot be ensured by a logged microservice and if the user client 2 has authorisations then the logging module 90 will send, to the proxy microservice 20, a message of unavailability NOT OK. Next, the proxy microservice 20 could in its turn transmit to the user client 2, for example via an aggregated interface 10, a message of unavailability NOT OK.

According to another aspect, the invention pertains to a computer system 1 for logging microservices preferably within the scope of a unified governance of a plurality of intensive computing solutions 70.

In particular, a computer system 1 for logging new microservices according to the invention may comprise: a token security microservice 30, at least one security repository 35, 36, 37, a logging module 90 and a service register 91.

The computer system 1 for logging new microservices could advantageously comprise: a proxy microservice 20, at least one computing microservice 50, 51, 52, 53, and one or more authorisation repositories.

Considering the implementation of the system according to the invention, this may be hosted by one or more computer servers. It comprises in particular a set of microservices such as microservices implemented according to node.js type encoding protocols or other technologies such as Go, Java/Kotlin/Scala, PHP, Python, Pharo, Elixir, Clojure and Haskell.

The microservices may use configuration entities, such as Json files or XML files or similar representations, as inputs to supply the base components of the logic, the transformations, the mapping and the management of the keys of the system 1.

Each of the services or solutions (token security services, management service, intensive computing solution) accessible via the proxy microservice 20 may be undertaken by a corresponding microservice or a chain of microservices supplying the logic for implementing the service supplied. Within the scope of the method according to the invention, the microservices may be executed individually and separately in a security zone as microservice(s).

A computer system 1 for logging microservices according to the invention may comprise a logging module 90. The logging module 90 may correspond to any hardware and software arrangement capable of enabling the execution of instructions.

The logging module 90 is notably configured to receive a logging request from a new microservice. This logging request could comprise data for accessing the resources of the new microservice but also advantageously the generated authentication token.

Moreover, a logging module 90 according to the invention could be configured to log data for accessing the resources of the new microservice on a service register 91. Indeed, the logging module 90 is preferably coupled to a service register 91. The service register 91 may comprise any computer readable support known in the art comprising, for example, a volatile memory, such as a static random access memory (SRAM) and a dynamic random access memory (DRAM), and/or a non-volatile memory, such as read-only memories, flash memories, hard disks, optical disks and magnetic tapes.

The logging will be done in particular when the authentication token has been validated, preferably by the token security microservices. Thus, the logging will be able to be carried out on reception of a confirmation message from the token security microservices. Alternatively, it is the proxy microservice 20 that will be able to be configured to carry out the verification with the token security microservices and which will transmit the logging request to the logging module 90.

Moreover, the logging module 90 may be configured to manage in real time the microservices of the governance platform (or logging computer system). Thus, the logging module 90 may be configured to contact periodically the microservices in such a way as to identify breakdowns, disconnections or other malfunctions.

In particular, a computer system 1 for logging microservices according to the invention may comprise a proxy microservice 20, configured to receive access information from a user client 2. The proxy microservice 20 may be coupled to a complement making it possible to take into account authorisation policies specific to each microservice (business logic), this enabling a normalisation of exchanges between the proxy microservice 20 and the token security microservice 30. In particular, it may be used to synchronise user attributes (potentially of very different nature to each other) in correspondence with roles specific to the business/microservice logics.

The proxy microservice 20 is advantageously configured to convey incoming requests to the appropriate microservice as a function of the specified endpoint, the logic and/or the arguments.

In a preferred manner, the proxy microservice 20 is configured to obtain with the logging module 90 data for accessing the resources of microservices notably computing microservices such as endpoints.

In particular, the computing microservices 50, 51, 52, 53 coupled to the proxy microservice 20 may be configured to point to (or be linked) respectively to a particular service or to a particular server. Thus, when a computing microservice is called, a corresponding intensive computing service is selected.

Moreover, the proxy microservice 20 could be configured to receive a message coming from an aggregated interface 10. In particular, the message coming from the aggregated interface 10 may comprise access command information of a user client 2. This access command information could correspond to parameters for which the user client requests a value or instead to data that the user client wishes to receive. The message coming from the aggregated interface 10 may moreover comprise identifier data of the user client 2.

The proxy microservice 20 may also be configured to determine data to aggregate from the accessible data. The determination of accessible data is carried out preferably by the computing microservice, for example via the selection of data memorised in a data memory accessible to the computing microservice. The determination of the data to aggregate could for example be based on data memorised in a data memory accessible to the proxy microservice 20.

Moreover, the proxy microservice 20 may be configured to receive access information of a user client 2. The proxy microservice 20 may be coupled to a complement making it possible to take into account authorisation policies specific to each microservice (business logic), this enabling a normalisation of exchanges between the proxy microservice 20 and the token security microservice 30. In particular, it may be used to synchronise user attributes (potentially of very different nature to each other) in correspondence with roles specific to the business/microservice logic.

In particular, a computer system 1 for logging microservices according to the invention comprises a token security microservice 30, configured to receive access information of a client such as a user client 2 or a third party client 15, to authenticate the client and to determine at least one role attribute for the client from access information and data memorised in a security repository 35,36,37.

The security repository or repositories and the authorisation repository may comprise any computer readable support known in the art comprising, for example, a volatile memory, such as a static random access memory (SRAM) and a dynamic random access memory (DRAM), and/or a non-volatile memory, such as read-only memories, flash memories, hard discs, optical disks and magnetic tapes. Moreover, they may comprise a plurality of instructions or modules or applications to carry out various functionalities. Thus, the security repository or repositories and the authorisation repository may implement routines, programmes, or matrix type data structures.

In a preferred manner, the token security microservice 30 is moreover configured to generate a token, said token enabling access to all the intensive computing solutions accessible to the user client 2 or to the third party client 15 as a function of the at least one determined role attribute.

In a preferred manner, although the token security microservice 30 forms part of a logging computer system 1 according to the invention, it is advantageously hosted on one or more different computer devices (e.g. servers) distinct from the computer device(s) hosting the proxy microservice 20 and/or the computing microservices 50, 51, 52, 53.

The token security microservice 30 may be configured to convey the incoming requests to the appropriate service as a function of the specified endpoint, logic and/or arguments.

In particular, the token security microservice 30 coupled to the proxy microservice 20 may be configured to point to (or be linked to) a particular service or to a particular server. The token security microservice 30 may be configured to access a plurality of repositories in the form of directories, preferably at least repositories in the form of LDAP 35, Active Directory 36 and Kerberos 37 type directories.

Moreover, the token security microservice 30 may advantageously be configured in such a way as to be able to attribute shared roles or specific roles, preferably it is configured in such a way as to be able to attribute a role shared by all the computing microservices 50, 51, 52, 53.

The computer system 1 for logging microservices according to the invention comprises at least one computing microservice 50, 51, 52, 53 for each of the intensive computing solutions 70, such as a high performance computing server 71, a server dedicated to supervised or unsupervised learning 72, a server dedicated to quantum computations 73. Each of the computing microservices 50, 51, 52, 53 may be connected to its respective intensive computing solution in secure channels such as ssh or mobile shell connections.

Preferably, each of the computing microservices 50, 51, 52, 53, is configured to determine authorisations granted to the user client 2.

Indeed, once a role attribute has been determined this may be transferred to a microservice which will be able, on the basis of the value of role attribute and data contained in an authorisation repository, to determine authorisations granted to the user client 2.

Each of the computing microservices 50, 51, 52, 53, is configured to receive first data for executing intensive computing operations generated by a first intensive computing solution and second data for executing intensive computing operations generated by a second intensive computing solution.

Preferably, each of the computing microservices 50, 51, 52, 53, is configured to determine the authorisations granted to the user client 2.

Indeed, once a role attribute has been determined it may be transferred to a microservice that will be able, on the basis of the value of role attribute and data contained in an authorisation repository, to determine the authorisations granted to the user client 2.

In particular, the computing microservices 50, 51, 52, 53 coupled to the proxy microservice 20 may be configured to point to (or be connected) respectively to a particular service or to a particular server. Thus, when a computing microservices is called, a corresponding intensive computation service is selected.

What is claimed is:

1. A method for logging microservices in a unified governance platform of a plurality of intensive computing solutions, said plurality of intensive computing solutions comprising at least two solutions selected from
   a first server comprising a high performance computing server,
   a second server dedicated to supervised or unsupervised learning, and
   a third server dedicated to quantum computations;
wherein the unified governance platform comprises
   a token security microservice hosted on a server distinct from the first server, the second server and the third server,
   at least one security repository,
   a logging element,
   a service register;
wherein said method for logging microservices comprises:
   receiving, by the token security microservice, of a join request from a new microservice, said join request comprising a unique identifier of the new microservice (IDMS);
   verifying, by the token security microservice, the unique identifier of the new microservice (IDMS) from information memorized in the at least one security repository;
   generating of an authentication token and transmitting the authentication token to the new microservice by the token security microservice;
   receiving, by the logging element, a logging request from the new microservice, said logging request comprising data that provides access to resources of the new microservice and the authentication token;
   verifying the authentication token with the token security microservice; and
   logging, by the logging element, when the authentication token is validated, the data that provides access to the resources of the new microservice on the service register.

2. The method for logging microservices according to claim 1, further comprising continuously updating the service register and in particular the data that provides access to the resources of the new microservice.

3. The method for logging microservices according to claim 1, wherein the join request further comprises a password of the new microservice and in that the token security microservice also verifies the password of the new microservice.

4. The method for logging microservices according to claim 1, wherein the join request further comprises an identifier of an administrator of the unified governance platform and a password for said administrator of the unified governance platform and in that the token security microservice also verifies the identifier of the administrator of the unified governance platform and its password.

5. The method for logging microservices according to claim 1, wherein the method further comprises
   receiving, by the logging element, the logging request (REQE) sent by the new microservice;
   sending, by the logging element, the authentication token to the token security microservice;
   then verifying the authentication token with the token security microservice.

6. The method for logging microservices according to claim 1, wherein the unified governance platform comprises a proxy microservice and wherein the method further comprises
   receiving, by the proxy microservice, the logging request (REQE) sent by the new microservice;
   sending, by the proxy microservice, the authentication token to the token security microservice;
   transmitting, by the proxy microservice, the logging request (REQE) to the logging element when the authentication token is validated.

7. The method for logging microservices according to claim 1, wherein the new microservice is made accessible to a user client at a level of an aggregated interface and wherein the method further comprising transmitting content data from the new microservice to the aggregated interface.

8. The method for logging microservices according to claim 1, wherein the unified governance platform comprises a proxy microservice and in that the method further comprises transmitting the data that provides access to the resources of the new microservice, by the logging element, to the proxy microservice.

9. The method for logging microservices according to claim 8, wherein the proxy microservice is configured, on reception of a service request (SREQ) from a user client, to transmit to the new microservice a request (EREQ) concerning access data received then to transmit the resources or contents (RES) obtained to the user client.

10. The method for logging microservices according to claim 1, wherein the method is configured to execute on a system comprising
   a security repository of said at least one security repository configured to memorize identification information of new microservices;
   said service register configured to memorize the data that provides access to the resources of the new microservices;
   microservice;
   wherein
      said receiving the join request from the new microservice,
      said verifying the unique identifier of the new microservice (IDMS),
      the generating the authentication token and the transmitting said authentication token to the new microservice,
   are executed on said token security microservice; and
   wherein
      said receiving said to request from said new microservice, and
      said logging, when the authentication token is validated, said data that provides access to the resources of the new microservice on the service register,
   are executed on said logging element.

\* \* \* \* \*